Jan. 17, 1928.                                                1,656,263
V. BENDIX
BRAKE CONTROL
Filed June 1, 1925                         3 Sheets-Sheet 1
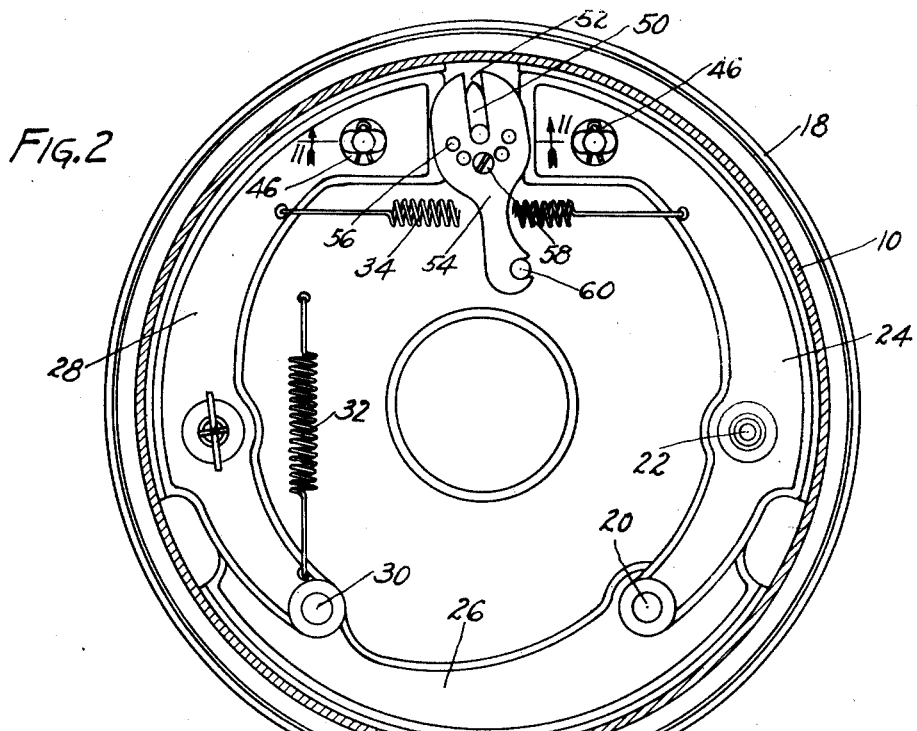
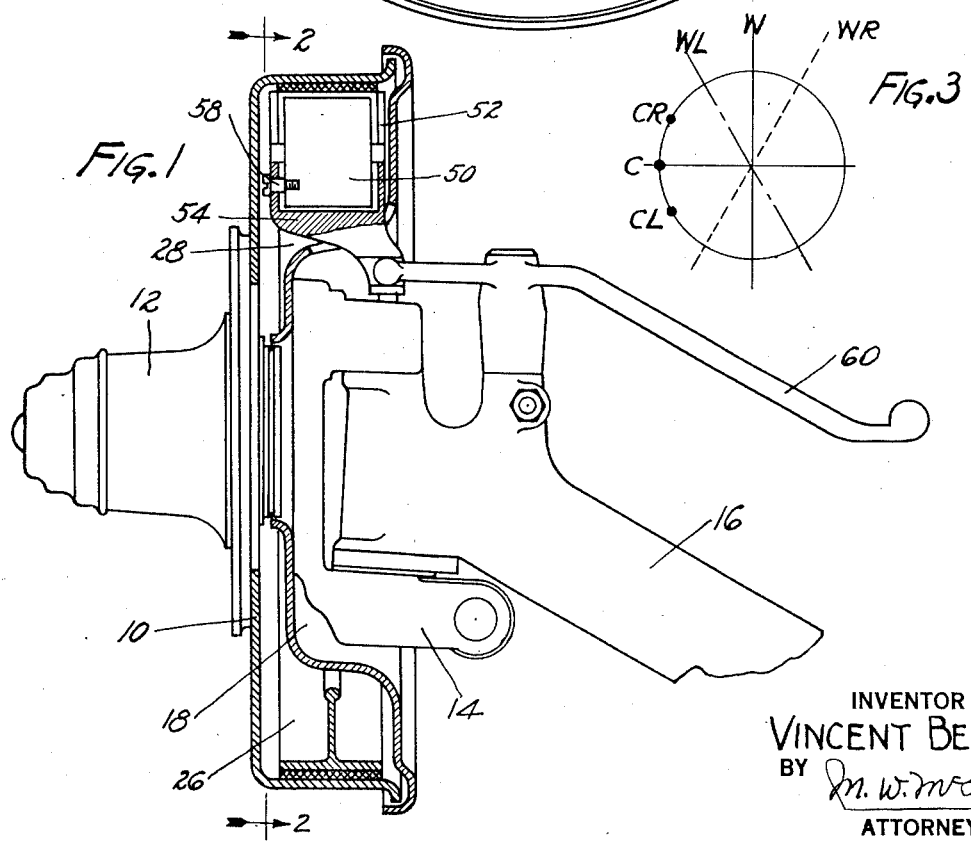
INVENTOR
VINCENT BENDIX
BY
M. W. McConkey
ATTORNEY Jan. 17, 1928.　　　V. BENDIX　　　1,656,263
BRAKE CONTROL
Filed June 1, 1925
3 Sheets-Sheet 2
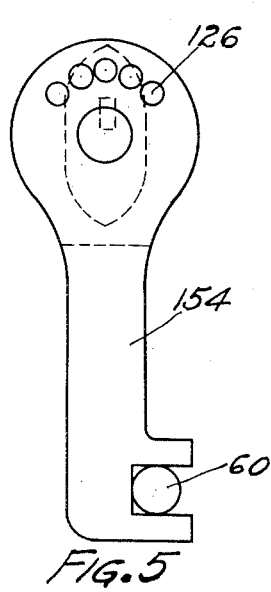
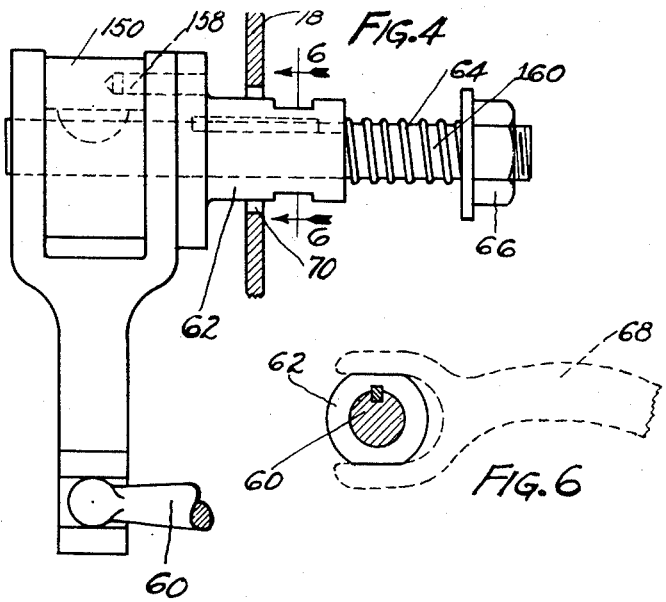
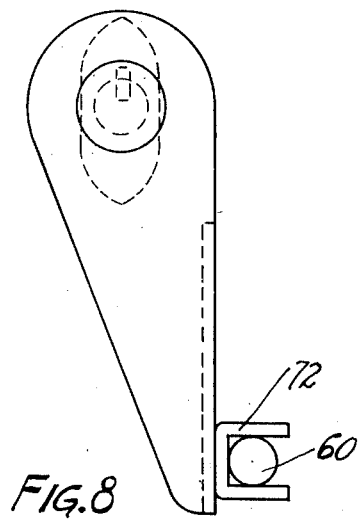
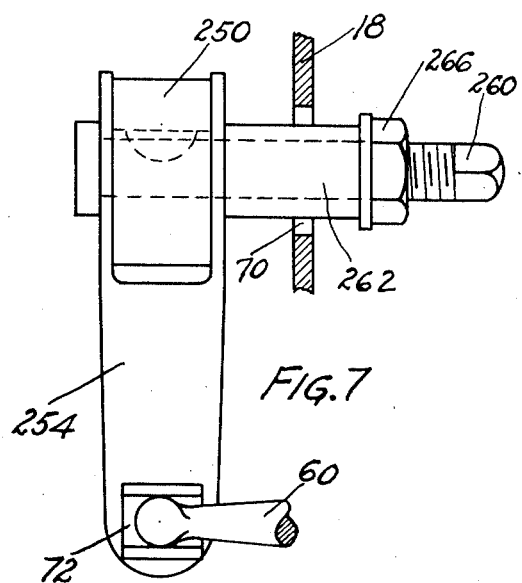
INVENTOR
VINCENT BENDIX
BY
*M. W. McConkey*
ATTORNEY Jan. 17, 1928.　　　V. BENDIX　　　1,656,263
BRAKE CONTROL
Filed June 1, 1925　　　3 Sheets-Sheet 3
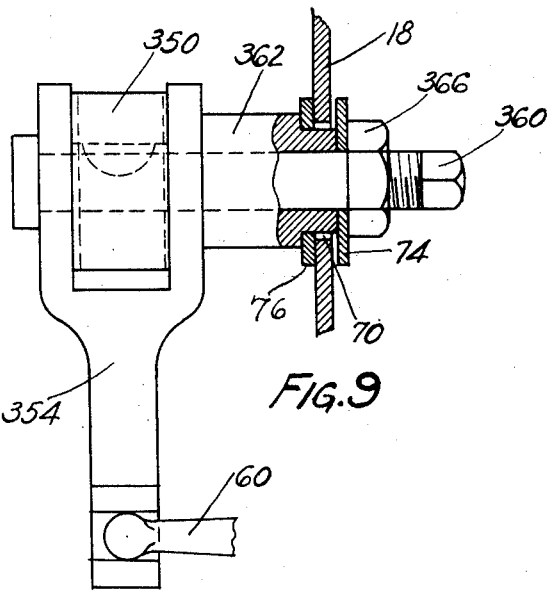
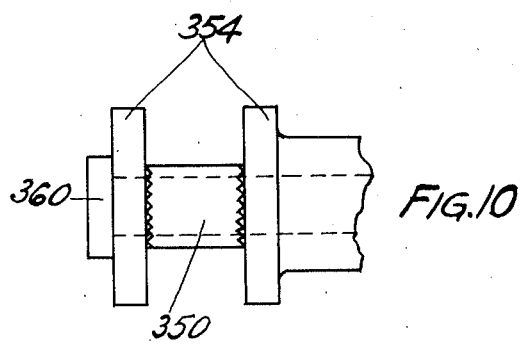
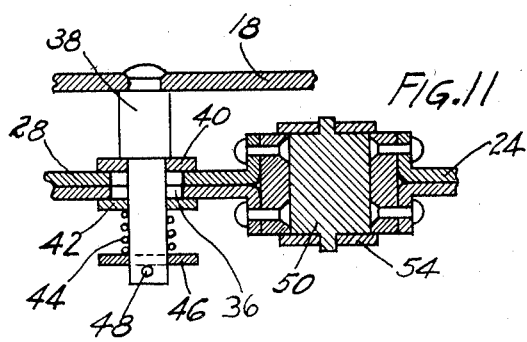
INVENTOR
VINCENT BENDIX
BY M. W. McConkey
ATTORNEY Patented Jan. 17, 1928.

1,656,263

UNITED STATES PATENT OFFICE.

VINCENT BENDIX, OF CHICAGO, ILLINOIS, ASSIGNOR TO BENDIX BRAKE COMPANY, OF CHICAGO, ILLINOIS, A CORPORATION OF ILLINOIS.

BRAKE CONTROL.

Application filed June 1, 1925. Serial No. 34,147. REISSUED

This invention relates to brakes, and is illustrated as embodied in a front wheel automobile brake and control. An object of the invention is to provide an improved control including a floating lever or the like for operating the brake, and which can shift its position automatically to equalize the pressure on the parts of the brake. The control is shown as embodying a cam, and a lever which is forked or otherwise formed to receive the cam, together with novel means for adjusting the relative angular positions of the cam and lever.

When used on a front or other swivelled wheel, I prefer to mount the control so that a part is movable from an idle position spaced from the swivelling axis to an axis substantially in that axis, means such as a pivoted lever being arranged to engage that part of the control to operate it. If it is desired to relieve the pressure on the outer brake, or otherwise vary the braking when the wheel is swivelled, the point of engagement is in active position slightly at one side of the swivelling axis.

The control embodies in itself substantial novelty, and important features of the invention relate to the arrangement for relative adjustment of the cam and lever, and to other novel combination of parts and desirable particular constructions which will be apparent from the following description of several illustrative embodiments shown in the accompanying drawings, in which:

Figure 1 is a vertical section through one front brake and associated parts;

Figure 2 is a vertical section through the brake on the line 2—2, Figure 1;

Figure 3 is a diagram showing on an exaggerated scale the arrangement of parts to cause variation in braking when the wheel is swivelled;

Figure 4 is a sectional view corresponding in a general way to part of Figure 1, and showing a modified control;

Figure 5 is an end elevation of the parts in Figure 4, looking from the left;

Figure 6 is a section on the line 6—6 of Figure 4, showing a wrench in dotted lines;

Figure 7 is a sectional view corresponding to Figure 4, showing a third modification;

Figure 8 is an end elevation, looking from the left in Figure 7;

Figure 9 is a sectional view corresponding to Figures 4 and 7, showing a fourth modification;

Figure 10 is a top plan view of some of the parts in Figure 9; and

Figure 11 is a section on the line 11—11, Figure 2.

In the arrangement shown in Figures 1–3 and 11, the brake is shown as including a drum 10 on a wheel, the hub of which appears at 12, and which is rotatably mounted on a knuckle 14 swivelled by the usual king pin at the end of the axle 16. The knuckle 14 carries the usual backing plate 18 of the brake, on which are anchored at 20 and 22, respectively, the reverse and forward shoes 24 and 26 of a three-shoe brake, the third or servo shoe 28 being connected to the forward shoe 26 at 30. Springs 32 and 34 urge the shoes away from the drum. Except as further described below, the above-identified parts or their equivalents may be of any desired construction.

As best appears in Figure 11, shoes 24 and 28, which are shown made of sheet-metal stampings arranged back to back to form a shoe generally T-shaped in cross-section, are formed with guide slots 36 for pins or studs 38 carried by the backing plate 18. Each stud is shouldered to support a washer 40 engaged by the web of the shoe. A second washer 42 slidable on the stud engages the other side of the web of the shoe, and a coil spring 44 is sleeved on the stud and confined between washer 42 and a stop 46, shown held by a cotter pin 48. The described parts form a novel and inexpensive form of what is usually called a "steady rest", for positioning the shoe laterally.

The shoes are shown in Figures 1 and 2 as operated by a double cam 50 having projections or pintles at its ends seated in slots 52 extending inwardly from the ends of the arms of a forked lever 54. In order to provide for adjustment of cam 50 between the arms of lever 54, one arm of the lever has a series of openings 56 arranged on an arc having its center in the axis of the pintles of the cam. The cam has a threaded opening which may be brought into alignment with one of the openings 56, and the adjustment of the cam is preserved by a pin or screw 58, as shown in Figure 1.

When used on a swivelled wheel, the lower end is formed to have a part moved from an idle position spaced from the swivelling axis to an active position in or immediately adjacent that axis. This part is shown in the form of a jaw embracing a ball end on a lever fulcrumed on the axle or king pin.

If it is desired to vary the braking when the wheel is swivelled, the point of engagement between arm 54 and lever 60 or equivalent is, in active position, slightly at one side of the swivelling axis. Figure 3 is a diagram, showing on a greatly enlarged scale, several times actual size, how the outer brake may be relieved on a turn. The circle has its center in the swivelling axis, i. e., the axis of the king pin. "W" is a line through this axis parallel to the wheel when the vehicle is moving straight ahead, and "C" indicates the position at this time of the point on lever 54 engaged by lever 60. When the wheel is swivelled to a position parallel to the dotted line "WR", to turn to the right, point C moves to a position "CR", away from lever 60, thus relieving the pressure on the brake, which is on the outer side of the turn. When the wheel is swivelled in the opposite direction to a position parallel to "WL", the point "C" tends to move toward "CL", i. e., lever 54 crowds against lever 60 to tighten its brakes. If lever 54 is operated by a cable or other tension member, instead of by lever 60, point "C" would be on the right side of the circle; that is, instead of being between the wheel and the swivelling axis it would be between the swivelling axis and the vehicle.

It will be observed that lever 54 and cam 50 are supported only by the brake shoes and by lever 60, and is thus free to float to equalize the pressure on the shoes.

In the modification of Figures 4–6, the cam 150 is received between the arms of a forked lever 154, and is keyed to a bolt 60, on which is splined a member 62 having a pin 158 adapted to be received in alined recesses 126 in the cam and lever. Member 62 is urged toward the left (Figure 4) by a spring 64 held by a threaded stop 66. As shown in Figure 6, a wrench 68 may be used to pull member 62 to the right (Figure 4) to pull the pin 158 out of the recesses, and then to turn member 62, bolt 60, and cam 150, to bring the recess in the cam opposite a different recess 126 in the lever, whereupon spring 64 again forces pin 158 into the alined recesses to preserve the adjustment. It will be observed that the backing plate 18 has a large opening 70, so that the adjustment may be made from outside the backing plate.

In the arrangement of Figures 7 and 8, lever 254 is made of a sheet metal stamping bent to have parallel arms receiving cam 250 keyed to a bolt 260 having a polygonal end for a wrench to turn the cam. The adjustment is preserved by tightening a nut 266 against a bushing 262, which may if desired be serrated at its end to form teeth engaging lever 254. A part 72 is riveted or spot-welded to the lever 254 to receive the end of lever 60.

The modification of Figures 9 and 10 differs from those just described, in that the forked lever 354 receives between its arms a cam 350 which is serrated on its sides to form teeth, and which is keyed to a bolt 360 which is squared at its end for adjusting the cam. A nut 366 may be tightened against a washer 74 engaging a bushing 362 to clamp the arms of lever 354 against the teeth of the cam. Bushing 362 may be a separate part or integral with lever 354. Another washer 76 engaging a shoulder on the bushing 362 is arranged on the opposite side of the backing plate 18 from the washer 74, the two washers serving as guides.

While several illustrative embodiments of the invention have been described in detail, it is not my intention to limit its scope to those particular embodiments, or otherwise than by the terms of the appended claims.

I claim:

1. A vehicle having an axle and a wheel mounted for swivelling movement at the end of the axle, together with retarding means comprising, in combination with said parts, a drum rotating with the wheel, an expansible friction device within the drum having adjacent free ends, a floating member having a cam part between said free ends and having another part movable in applying the brake toward the swivelling axis from an idle position spaced some distance from the swivelling axis, and means engaging the other part of said member for operating the retarding means.

2. A vehicle having an axle and a wheel mounted for swivelling movement at the end of the axle, together with retarding means comprising, in combination with said parts, a drum rotating with the wheel, an expansible friction device within the drum having adjacent free ends, a floating member having a cam part between said free ends and having another part movable in applying the brake toward the swivelling axis from an idle position spaced some distance from the swivelling axis, and a pivoted lever with one end engaging the other part of said member for operating the retarding means.

3. A vehicle having an axle and a wheel mounted for swivelling movement at the end of the axle, together with retarding means comprising, in combination with said parts, a drum rotating with the wheel, an expansible friction device within the drum having adjacent free ends, a member having arms at opposite sides of said ends and having a part movable in applying the brake toward the swivelling axis from a position spaced from the swivelling axis, a cam adjustably mounted between the arms of said member and engaging the ends of the friction device, and means engaging said part of the member for operating the retarding means.

4. A brake comprising friction means having adjacent separable ends, a floating brake-applying device having a cam between said ends and having an operating lever extending from the cam, and applying means operatively engaging the end of the lever and with said ends serving to support said device.

5. A brake comprising, in combination, a drum, an expansible friction device within the drum including parts arranged for movement in opposite directions to apply the brake, a member having arms at opposite sides of said parts, and a cam adjustably mounted between the arms and engaging said parts.

6. A brake comprising friction means having adjacent separable ends, a floating brake-applying device having a cam between said ends and having an operating lever extending from the cam, and applying means including a second lever having its end connected to the end of the operating lever and with said ends serving to support said device.

7. A vehicle having an axle and a wheel mounted for swivelling movement at the end of the axle, together with retarding means comprising, in combination with said parts, a drum rotating with the wheel, an expansible friction device within the drum, a floating member for expanding said device and having a part movable from an idle position spaced from the swivelling axis to a position immediately adjacent said axis, and means engaging said part of the member for operating the retarding means, the point of engagement in active position being so arranged with respect to the swivelling axis that the retarding effect is varied when the wheel is swivelled.

8. A vehicle having an axle and a wheel mounted for swivelling movement at the end of the axle, together with retarding means comprising, in combination with said parts, a drum rotating with the wheel, an expansible friction device within the drum, a floating member for expanding said device and having a part movable from an idle position spaced from the swivelling axis to a position immediately adjacent said axis, and a lever engaging said part of the member for operating the retarding means, the point of engagement in active position being between the swivelling axis and the wheel, to relieve the pressure on the friction device when the wheel is on the outside of a turn.

9. A brake comprising, in combination, a drum, an expansible friction device within the drum, a cam for expanding said device, and an arm for operating the cam and on which arm the cam is pivotally mounted, the arm and cam having a pin and series of recesses for adjusting their relative angular positions.

10. A brake comprising, in combination, a drum, an expansible friction device within the drum, a cam for expanding said device, an arm for operating the cam and on which arm the cam is pivotally mounted, the arm and cam having a pin and series of recesses for adjusting their relative angular positions, and means for shifting the pin from one recess to another.

11. A brake control comprising, in combination, a forked lever, and a cam adjustably mounted between the arms of the lever.

12. A brake control comprising, in combination, a forked lever, and a cam adjustable between the arms of the lever without removal.

13. A brake control device including a forked lever having an arcuate series of openings in one of its arms for an adjusting pin, and having in both arms pivot bearings coaxial with respect to said series.

14. A brake comprising, in combination, a drum, an expansible friction device within the drum including parts arranged for movement in opposite directions to apply the brake, a forked operating member having arms at opposite sides of said parts, and means adjustably mounted between the arms for engaging said parts.

15. A brake control comprising, in combination, a cam, an arm for operating the cam, the cam and arm having recesses, and a separate spring-held member having a pin arranged for insertion in alined recesses in the cam and arm.

16. A brake control comprising, in combination, a cam, an arm for operating the cam, the cam and arm having recesses, a member having a pin arranged for insertion in alined recesses in the cam and arm, and a spring urging said member in a direction to hold the pin in the recesses.

17. A brake control comprising, in combination, a cam, an arm for operating the cam, the cam and arm having recesses, a member having a pin arranged for insertion in alined recesses in the cam and arm, and a spring urging said member in a direction to hold the pin in the recesses, the member being movable against the resistance of the spring to withdraw the pin from the recesses to permit relative angular adjustment of the cam and arm.

18. A brake control comprising, in combination, a cam, an arm for operating the cam, the cam and arm having recesses, a member having a pin arranged for insertion in alined recesses in the cam and arm, and a spring urging said member in a direction to hold the pin in the recesses, the member being movable against the resistance of the spring to withdraw the pin from the recesses to permit relative angular adjustment of the cam and arm, and having flat surfaces for engagement by a wrench to move it as described.

19. A brake control comprising, in combination, a cam, a device for operating the cam, the cam and said device having recesses, a member movable axially of the cam but connected to the cam to prevent relative angular movement, a pin carried by the member received in alined recesses in the cam and said device, and a spring urging the pin into the recesses, said member being operable to withdraw the pin against the resistance of the spring and to turn the cam with respect to said device for adjustment.

20. A brake control comprising, in combination, a forked lever, a cam between the arms of the lever, and means outside of the fork for turning the cam between said arms.

21. A brake control comprising, in combination, a forked lever, a cam between the arms of the lever, a part connected to the cam and projecting through one of the arms and operable to turn the cam between the arms, and means adjustable to prevent relative angular movement of the lever and cam.

22. A brake control comprising, in combination, a forked lever, a cam between the arms of the lever, a part connected to the cam and projecting through one of the arms and operable to turn the cam between the arms, and means to connect the lever and said part to prevent relative angular movement of the cam and lever when the control is in use.

23. A brake comprising, in combination, a drum, a backing plate, a friction device between the drug and backing plate, a cam for operating the friction device, a forked lever embracing the cam, and means connecting the cam and lever and arranged to be operated from outside the backing plate to adjust the cam with respect to the lever.

24. A brake comprising, in combination, a drum, a backing plate having an opening, a friction device between the drum and backing plate, a cam for operating the friction device, a forked lever embracing the cam, and means connecting the cam and lever and including parts projecting through the opening in the backing plate and operable to adjust the cam with respect to the lever.

25. A brake comprising, in combination, a drum, a backing plate, friction means between the drum and backing plate, a device for operating the friction means and allowed to float for automatic equalization of said means, and means operable from outside the backing plate for adjusting said device.

26. A brake comprising, in combination, a drum, expansible friction means within the drum, an operating device carried by one end of a floating lever arranged substantially radially of the drum, and means engaging the other end of the lever for operating it and for preventing its movement radially of the drum.

27. A brake comprising, in combination, a drum, an expansible friction device within the drum having parts arranged for movement in opposite directions to apply the brake, a member having arms at opposite sides of said parts, and means adjustably mounted between the arms for engaging the parts to apply the brake.

28. A brake comprising, in combination, a drum, a backing plate, an expansible friction device within the drum having free ends arranged for movement in opposite directions to apply the brake, a member having arms at opposite sides of said parts, means mounted between the arms for engaging the parts to apply the brake, and means for holding said free ends laterally with respect to the backing plate.

29. A brake comprising, in combination, a drum, a friction device engagable with the drum, a brake-applying device including a lever which is unsupported against radial movement at the end adjacent the friction device, and means for rocking the lever to apply said device and which is constructed and arranged to support the lever against radial movement.

30. A brake comprising, in combination, a drum, a friction device engageable with the drum, a floating brake-applying device including a lever having a fork at its free end, and a member for rocking the lever to apply said device and which is received in said fork to support the floating device and lever.

In testimony whereof I have hereunto signed my name.

VINCENT BENDIX.